(12) United States Patent
Shukh et al.

(10) Patent No.: US 6,972,932 B2
(45) Date of Patent: Dec. 6, 2005

(54) HIGH-EFFICIENCY SINGLE-TURN WRITE HEAD FOR HIGH-SPEED RECORDING

(75) Inventors: Alexander M. Shukh, Savage, MN (US); Johannes Van Ek, Minnetonka, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 117 days.

(21) Appl. No.: 09/949,407

(22) Filed: Sep. 6, 2001

(65) Prior Publication Data

US 2002/0027750 A1 Mar. 7, 2002

Related U.S. Application Data

(60) Provisional application No. 60/230,400, filed on Sep. 6, 2000.

(51) Int. Cl.[7] ............................................. G11B 5/127
(52) U.S. Cl. .................................................... 360/317
(58) Field of Search ................................ 360/317, 318, 360/126, 97.01; 216/22; 437/200

(56) References Cited

U.S. PATENT DOCUMENTS

| | | | | |
|---|---|---|---|---|
| 4,860,139 A | | 8/1989 | Hamilton ..................... 360/126 |
| 5,032,945 A | * | 7/1991 | Aryle et al. ................. 360/126 |
| 5,168,409 A | * | 12/1992 | Koyama et al. ............. 360/317 |
| 5,184,267 A | | 2/1993 | Mallary ....................... 360/126 |
| 5,195,005 A | | 3/1993 | Mallary et al. ............. 360/126 |
| 5,311,386 A | | 5/1994 | Mallary ....................... 360/126 |
| 5,510,295 A | * | 4/1996 | Carbal et al. ............... 437/200 |
| 5,717,547 A | | 2/1998 | Young ......................... 360/246 |
| 6,034,847 A | * | 3/2000 | Komuro et al. ............. 360/126 |
| 6,064,546 A | * | 5/2000 | Takano et al. ............ 360/97.01 |
| 6,198,607 B1 | | 3/2001 | Cain et al. ................. 360/318.1 |
| 6,256,863 B1 | * | 7/2001 | Saito et al. .............. 29/603.08 |
| 6,285,528 B1 | * | 9/2001 | Akiyama et al. ........... 360/126 |
| 6,292,329 B1 | * | 9/2001 | Sato et al. .................. 360/126 |
| 6,524,491 B1 | * | 2/2003 | Liu et al. ....................... 216/22 |

OTHER PUBLICATIONS

Jason Jury et al, "Design of a Single-turn Microstrip Write Head" Sep. 1999; IEEE trans. on Magnetics, V.35, No. 1; pp 2547-2549.*

Jury, J., et al., "Design of a Single-turn Microstrip Write Head for Ultra-high Data Rate Recording", *IEEE Transactions on Magnetics*, 35 (5), pp. 2547-2549,(1999).

(Continued)

*Primary Examiner*—Tianjie Chen

(57) ABSTRACT

A write element for a magnetoresistive ("MR") head or a giant magnetoresistive (GMR) head includes a yoke and a coil. The coil made of a microstrip transmission line. The coil is a single turn and is U-shaped. The yoke of the write element includes laminated bottom pole, and top pole which are made of thin layers of ferromagnetic material antiferromagnetically exchange coupled to each other through a very thin nonmagnetic metallic layer. The yoke is made of metallic superlattices exhibiting strong antiferromagnetic exchange coupling between ferromagnetic layers through thin nonmagnetic metallic layers. The coil and the yoke are intertwined to provide two or more flux interactions between them. The yoke has a symmetrical structure with three interconnect vias, thereby reducing the effective magnetic length of the yoke. The antiferromagnetically exchange-coupled yoke has a stable single domain structure that exhibits very high switching time and does not suffer from hysteresis losses.

25 Claims, 8 Drawing Sheets

OTHER PUBLICATIONS

Mallary, M., et al., "A New Thin Film Head which Doubles the Flux through the Coil", *IEEE Transactions on Magnetics, 29* (6), pp. 3832-3836, (1993).

Mallary, M., et al., "Advanced Multi-Via Heads", *IEEE Transactions on Magnetics, 30* (2), pp. 287-290, (1994).

Parkin, S., "Systematic Variation of the Strength and Oscillation Period of Indirect Magnetic Exchange Coupling through the 3d, 4d, and 5d Trasition Metals", *Physical Review Letters, 67* (25), pp. 3598-3601, (1991).

\* cited by examiner

HIGH-EFFICIENCY SINGLE-TURN WRITE HEAD FOR HIGH-SPEED RECORDING

RELATED APPLICATION

This application claims the benefit of U.S. Provisional Application Ser. No. 60/230,400 entitled "HIGH-EFFICIENCY SINGLE-TURN WRITE HEAD FOR HIGH-SPEED RECORDING", filed Sep. 6, 2000 under 35 U.S.C. 119(e).

FIELD OF THE INVENTION

This application relates generally to the field of electronic data storage and retrieval. More particularly, this invention relates to a transducer which includes a write element having a single-turn for high-speed magnetic recording with high efficiency.

BACKGROUND OF THE INVENTION

One of the key components of any computer system is a place to store data. One common place for storing data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls many of the operations of the disc drive including control of a data channel which passes data between a computer and the disc drive. Disc drive manufacturers are constantly increasing the amount of data that can be stored on the discs of a disc drive. The number of tracks per inch, the data density of bits or individual transitions within a track, as well as the rotational speed of the disc have all been increased over the years to increase the data capacity of disc drives. Increasing the data density within the track and the rotational speed of the disc have necessitated improvements in the speed or data rate of the data channel. In order to further increase the data capacity of disc drives, the transducer must be able to write and read data at increased data rates. In other words, the transducer will have to be able to write transitions to the disc at an increased rate and will have to be able to read transitions from the disc at an increased rate.

One type of transducer used in current disc drives is a giant magnetoresistive ("GMR") read/write head.

A GMR read/write head generally consists of two portions, a writer portion for storing magnetically-encoded information on a magnetic disc and a reader portion for retrieving magnetically-encoded information from the disc. The reader portion typically consists of a bottom shield, a top shield, and a giant magnetoresistive (GMR) sensor positioned between the bottom and top shields. Magnetic flux from the surface of the disc causes rotation of the magnetization vector of a free layer of the GMR sensor, which in turn causes a change in electrical resistivity of the GMR sensor. The change in resistivity of the GMR sensor can be detected by passing a current through the GMR sensor and measuring a voltage across the GMR sensor. External circuitry then coverts the voltage information into an appropriate format and manipulates that information as necessary.

The writer portion typically consists of a top and a bottom pole, which are separated from each other at an air bearing surface of the writer by a gap layer, and which are connected to each other at a region distal from the air bearing surface by a back gap closer or back via. Positioned between the top and bottom poles are one or more layers of conductive coils encapsulated by insulating layers. The writer portion and the reader portion are often arranged in a merged configuration in which a shared pole serves as both the top shield in the reader portion and the bottom pole in the writer portion.

To write data to the magnetic media, an electrical current is caused to flow through the conductive coils to thereby induce a magnetic field across the write gap between the top and bottom poles. By reversing the polarity of the current through the coils, the polarity of the data written to the magnetic media is also reversed. Because the top pole is generally the trailing pole of the top and bottom poles, the top pole is used to physically write the data to the magnetic media. Accordingly, it is the top pole that defines the track width of the written data. More specifically, the track width is defined by the width of the top pole at the air bearing surface.

The data rate is one of the main characteristics of current disk drives. The MR element or GMR element is a spin valve and has no inductance or reluctance. As a result, the MR or GMR element can read at very high frequencies. As a result, the read element is able to accommodate high data rates. The limiting portion of hardware is the write element. The data rate of drives depends considerably on recording head or write element parameters, such as inductance, core length, domain structure, and resonance frequency. The inductance of the write head is defined primarily by the number of coil turns. To support high-speed recording, the smallest possible number of turns is highly desirable. Hence a write element with a single-turn coil should have minimal inductance. However, the write field is proportional to the number of coil turns and the write current. Decreasing the number of turns will require an increase of the write current, which is quite difficult to provide due to preamplifier limitations.

Current write elements use a coil. Conventional coils have problems at high data rates or when operating at high frequency. When recording at high data rates, the electrical wavelength is comparable to the coil dimensions. The result is that the conventional coil conductor cannot be used due to extensive losses.

The switching time of the write element during recording depends on the length and the domain structure of the yoke. Multidomain structure assumes the presence of domain walls that have low mobility, resulting in an increase of the write element switching time. Moreover, the domain walls cause power losses in the yoke that are proportional to the coercivity of the yoke.

The ferromagnetic resonance in the yoke can limit the efficiency and frequency range of the write element. To suppress that effect, the frequency of the ferromagnetic resonance of the yoke needs to be increased. The frequency of the ferromagnetic resonance increases with the increase of the effective anisotropy field of the yoke or with the reduction of permeability of the yoke material.

Therefore, what is needed is a write element capable of supporting a high data rate. A low reluctance, low inductance coil is needed. In addition, the coil must be able to handle information changing at high frequency without excessive loss in transmission. In addition, there is a need for a yoke with an increased ferromagnetic resonance. None of the existing write elements satisfies the above-mentioned needs.

SUMMARY OF THE PROPOSED SOLUTION

The present invention relates to a merged giant magnetoresistance (GMR) head for high data rate, and particularly, to the writing part of the head, which is capable of recording at a very high speed. The write element has a laminated antiferromagnetically exchange-coupled yoke and single-turn coil made of a microstrip transmission line. The coil and the yoke are intertwined to provide two or more flux interactions between them.

The write element includes a symmetrical planar magnetic yoke and single-turn coil. The coil has a U-shape form and a microstrip transmission line structure. The coil with the microstrip structure is capable of transmitting electrical signals with minimal loss in gygohertz diapason. The yoke is formed into a figure eight shape ($\infty$-shape) and wrapped around the single-turn coil twice. That doubles the effective number of turns without increasing coil resistance and results in a substantial increase of the magnetic field produced by the write head. The yoke has a symmetrical structure with three interconnect vias, thereby reducing the effective magnetic length of the yoke. The yoke is made of metallic superlattices exhibiting strong antiferromagnetic exchange coupling between ferromagnetic layers through thin nonmagnetic metallic layers. The antiferromagnetically exchange-coupled yoke has a stable single domain structure that exhibits very high switching time and does not suffer from hysteresis losses.

For a fuller understanding of the nature and advantages of the present solution, reference should be made to the following drawings.

DETAILED DESCRIPTION

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

The invention described in this application is useful with all mechanical configurations of disc drives having either rotary or linear actuation. In addition, the invention is also useful in all types of devices which use magnetic write elements. For example, the invention described could also be used in tape drives where magnetic transitions are formed on magnetic tape.

Figure 1:
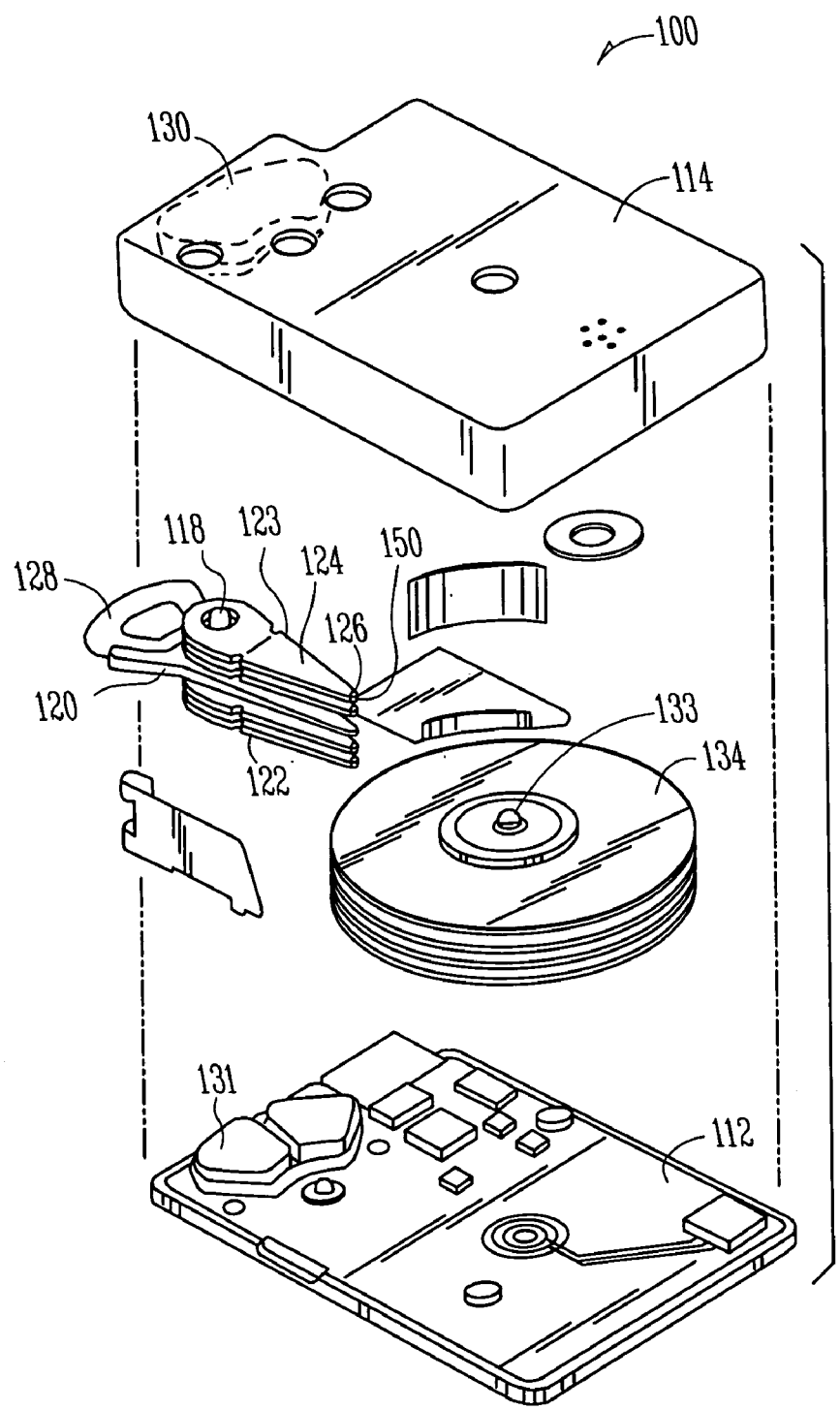
FIG. 1 is an exploded view of a disc drive with a multiple disc stack.

FIG. 1 is a view of one type of device that uses a magnetic write element. FIG. 1 is an exploded of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. On the end of the actuator assembly 120 opposite the load springs 124 and the sliders 126 is a voice coil 128. The actuator assembly 120 is used to place the transducing in transducing relation with respect to the disc 134 so that magnetic transitions representing data can be written to a track on the disc 134 or so that the magnetic transducer can read data from the disc 134. It should be noted that this invention is applicable to sliders having more than one transducer. As will be discussed in more detail below, the transducer of the invention has a separate read element and write element.

Attached within the base 112 is a pair of magnets 130 and 131. The pair of magnets 130 and 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to such other disc drives.

Figure 2:
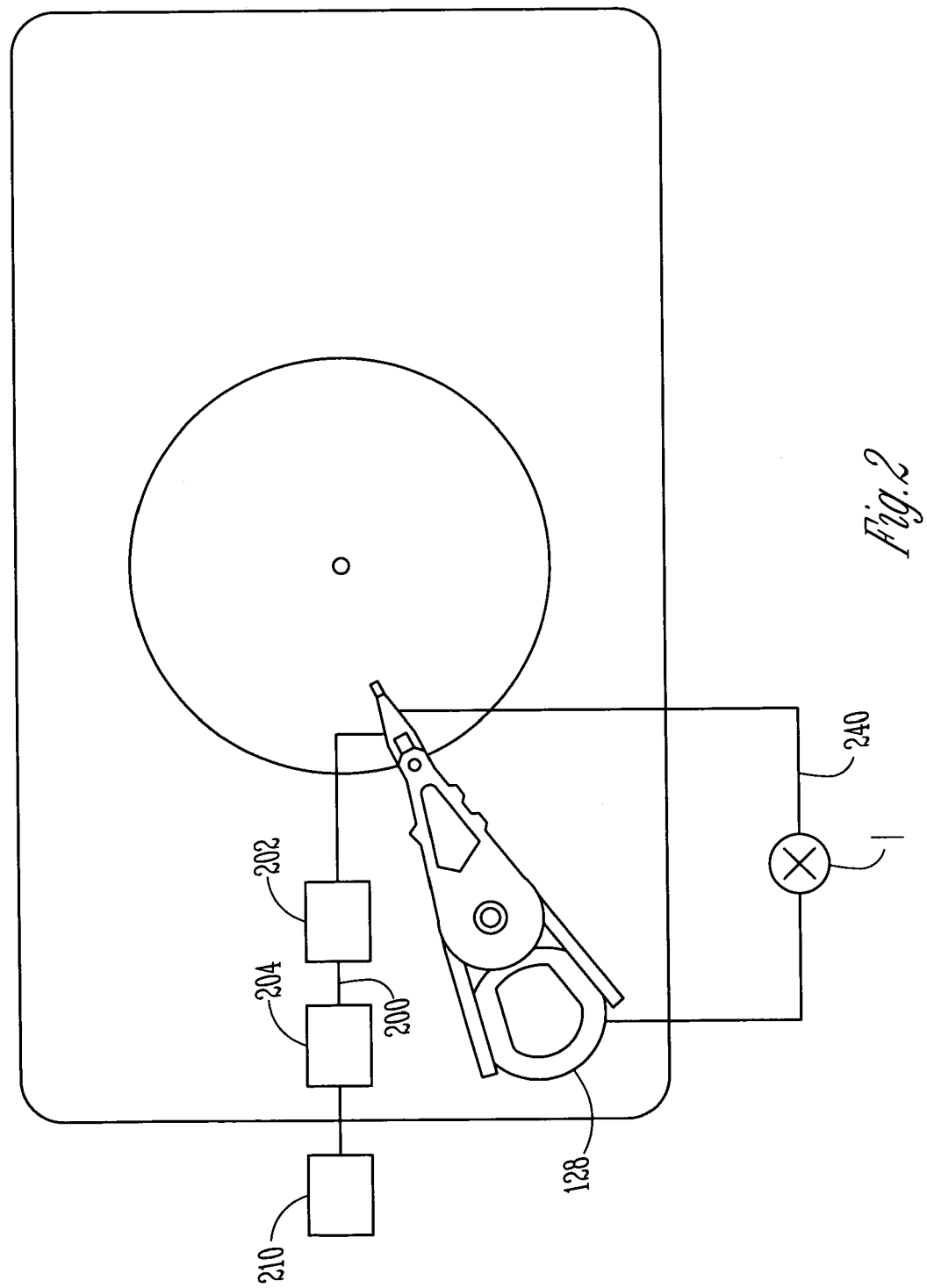
FIG. 2 is a schematic view of the drive electronics of the disc drive.

As shown schematically in FIG. 2, the disc drive includes electronics packages. These electronics packages include a data channel 200 which is used to encode and place individual magnetic transitions representing data onto the disc 134, and which is used to decode the individual magnetic transitions upon reading and reassemble these into data. The data channel includes a preamp 202, a data channel chip 204 and an interface 210 to a main computer. The electronics also include servo control circuit 240 for determining the amount of current that needs to be used with the voice coil 128 keep the transducer 150 over a desired track or to move the transducer 150 from one track to another track on the disc 134. Although the schematic shows these circuits off the disc drive 100, these circuits are generally part of the disc drive. In many disc drives these circuits are found in one or more chips attached to a printed circuit which is in turn attached to the base 112 of the disc drive 100.

Figure 3:
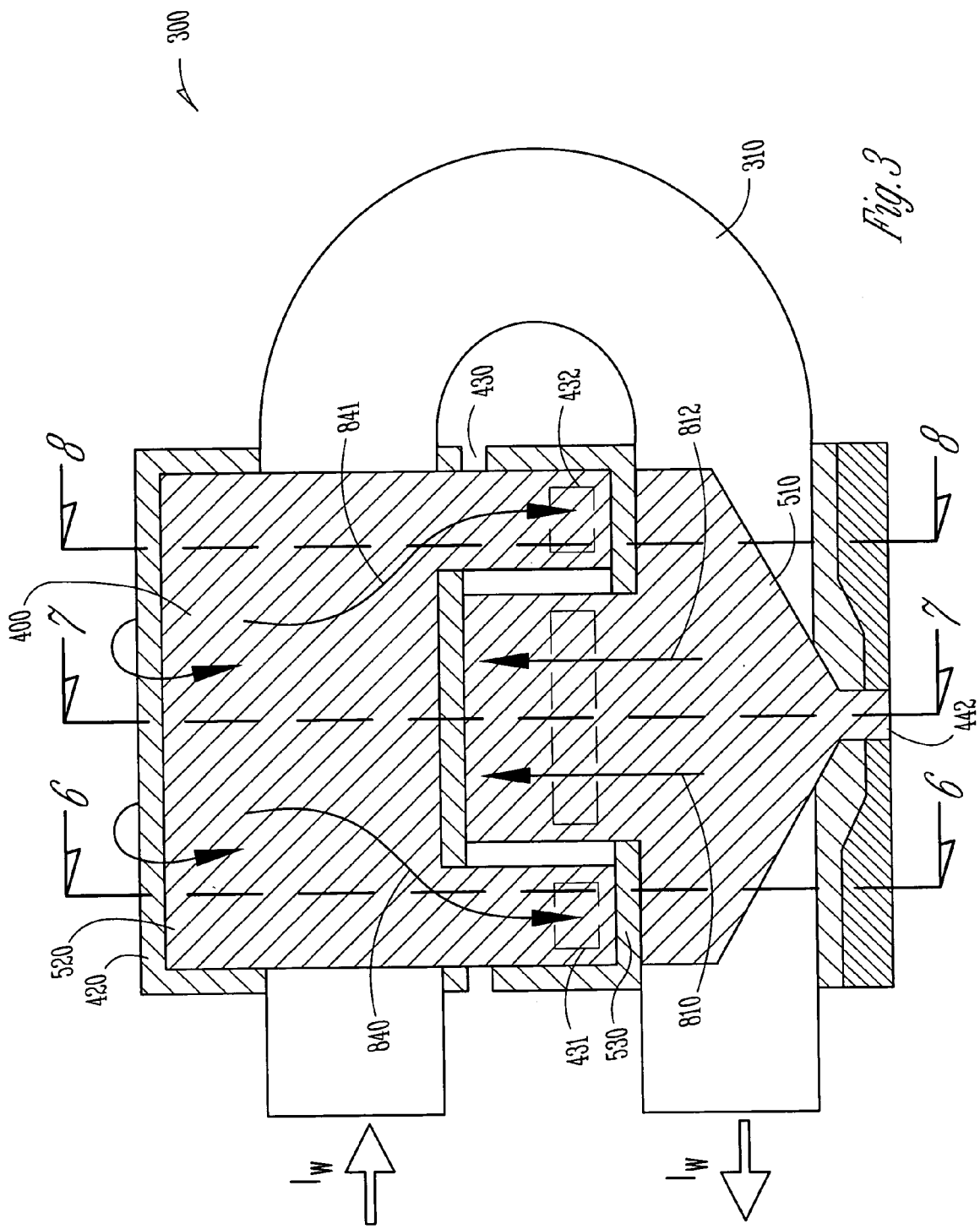
FIG. 3 is a plan view of a single-turn write element according to the present invention.

FIG. 3 is a plan view of a single-turn write element 300 according to the present invention. The single-turn write element 300 includes a yoke 400 and a coil 310. The write element 300 has a single-turn coil 310 made as a microstrip transmission line. The coil 310 consists of two conductive layers 311 and 313, isolated from each other by insulating layer 312. The coil 310 is substantially U-shaped.

The coil 310 is formed as a transmission line so that through put signal is maximized and the transmission is done without excessive losses. More particularly, the coil 310 is a microstrip transmission line that has a conductive circuit on top of a dielectric substrate with a ground plane below the substrate. The microstrip transmission line avails itself of low cost production in large volume and no connecters are required between the circuit elements, thereby reducing size and resulting in very low losses. The two conductive layers 311 and 313, as well as the insulative layer 312 between the conductive layers 311 and 313, are geometrically positioned to produce a frequency impedance match. The size of the conductor, the spacing of the conductors with respect to the ground plane, and the geometry of the ground plane all affect the conductance and inductance of the conductors. The insulators and the separator are also spaced so that their permicivity and permeability produces a matched impedance. The advantages of using a coil 310 formed as a microstrip transmission line or a transmission line is that the write element is capable of handling high frequency write current and therefore can write data at a very high data rate.

Figure 5:
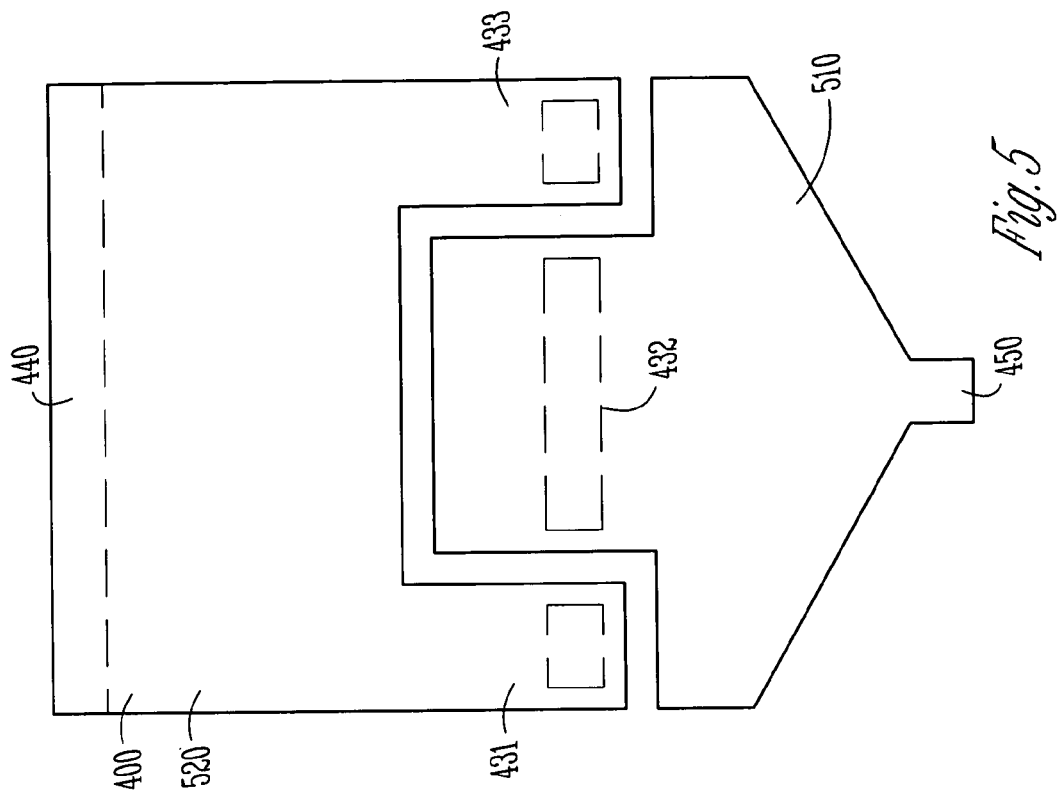
FIG. 5 is a view of the pole portions on a second level according to the present invention.
Figure 4:
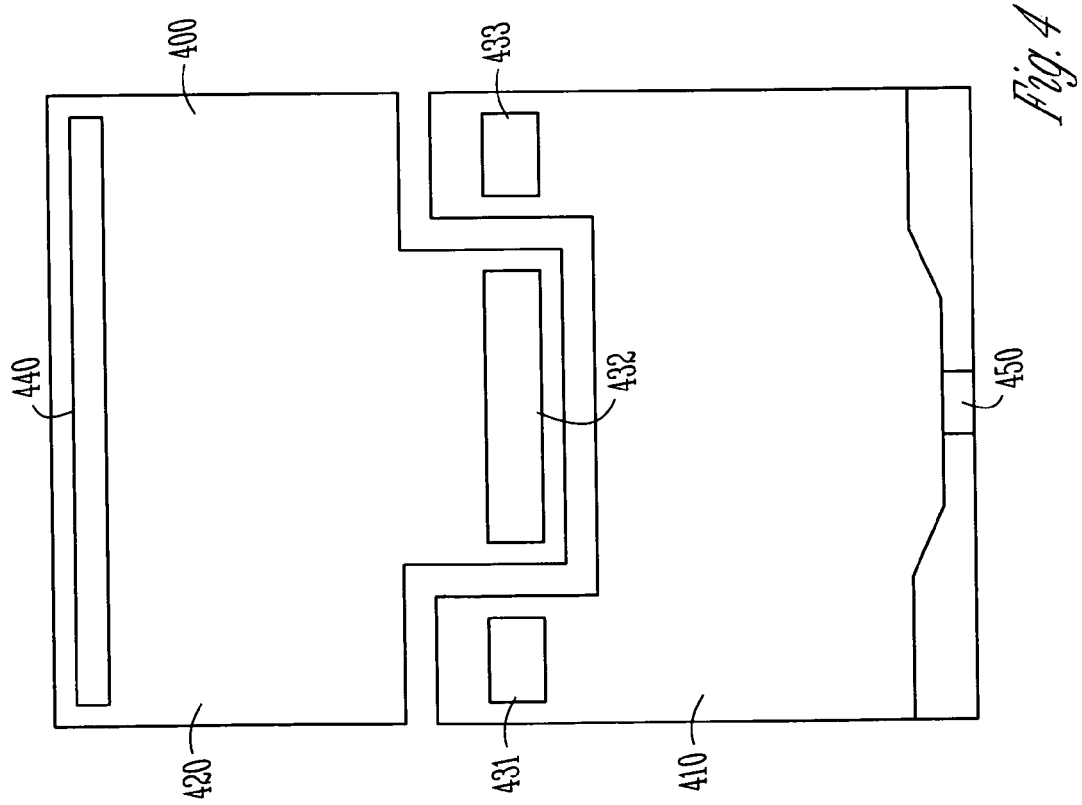
FIG. 4 is a view of the pole portions on a first level according to the present invention.
Figure 8:
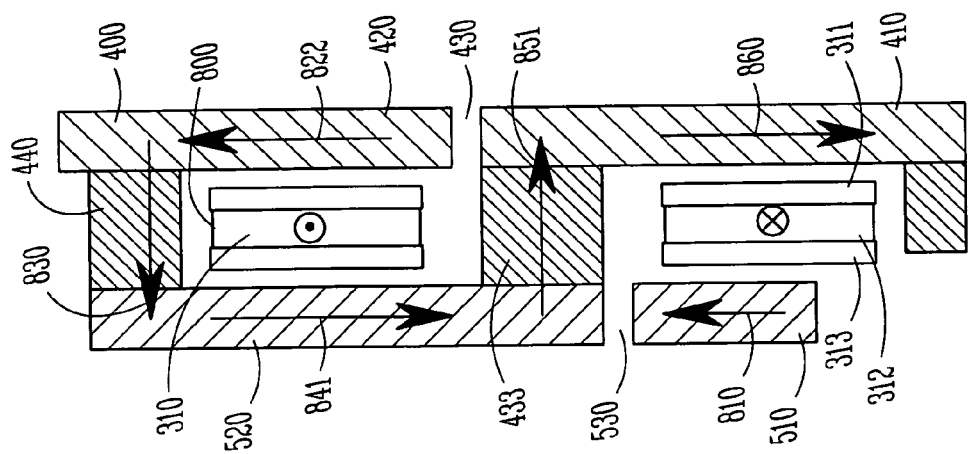
FIG. 8 is a cross-sectional view along line 8—8 of the write element shown in FIG. 3.
Figure 7:
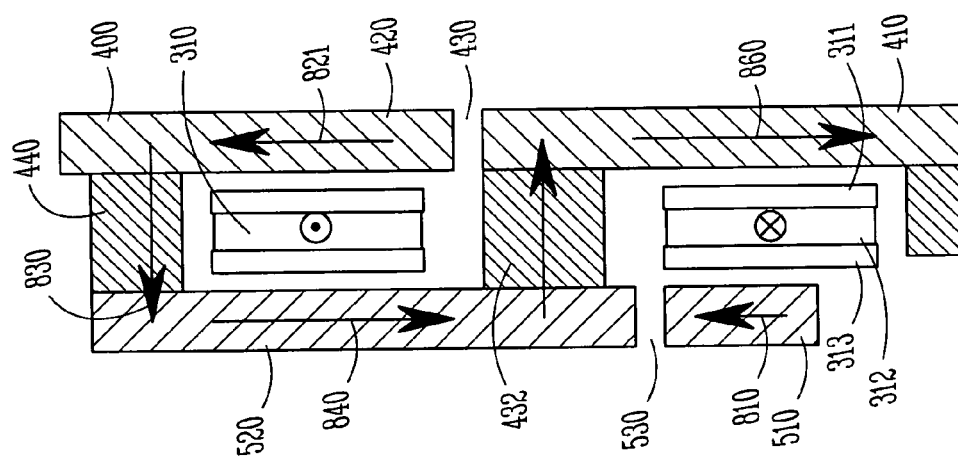
FIG. 7 is a cross-sectional view along line 7—7 of the write element shown in FIG. 3.
Figure 6:
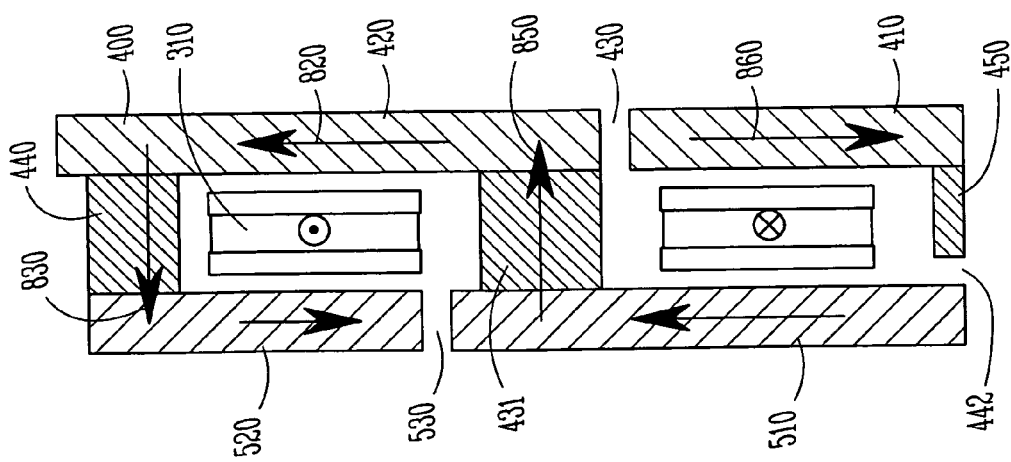
FIG. 6 is a cross-sectional view along line 6—6 of the write element shown in FIG. 3.

Turning now to FIGS. 4 and 5, the geometry of the yoke 400 will be discussed. The yoke 400 is comprised of four yoke portions 410, 420, 510, 520 of material in two planes. FIG. 4 is a view of the two yoke portions 410, 420 on a first plane or first level. FIG. 5 is a view of the two yoke portions 510, 520 on a second level or second plane. As can be seen, each of the yoke portions 410, 420, 510, 520 are symmetrical. The yoke portions on the first plane 410, 420 overlap the yoke portions 510, 520 on the second plane. The yoke portions 410, 420 of the on the first plane are interconnected with the yoke portions on the second plane to form a substantially figure 8-shaped magnetic flux path that wraps around the legs of the U-shaped coil 300. The yoke portions 410, 420 on the first plane are situated behind the yoke portions 510, 520 in FIG. 3. The yoke portion 410 connects to yoke portion 520 via a first external magnetic stud 431 and a second magnetic external stud 433. The yoke portion 420 connects to the yoke portion 510 by a central magnetic stud 432. Another magnetic stud 440 connects the yoke portion 520 and the yoke portion 420 at one end of the flux path. At the other end of the flux path a small magnetic stud 450 is attached to yoke portion 410 and does not touch yoke portion 510. A write gap 442 is formed. The FIGS. 6, 7 and 8 are various cross sectional views of the write element 300 shown in FIG. 3. Now looking at FIGS. 3, 6, 7, 8, the magnetic yoke 310 of the write element 300 consists of a planar bottom pole 410, 510 and top pole 420, 520 with a nonmagnetic write gap 442 is formed at the air-bearing surface of the slider. The yoke is wrapped around the U-shaped single-turn coil 310 twice, thus doubling the effective number of turns. To provide double interaction between the coil 310 and the yoke 400, the bottom pole 410, 510 and top pole 420, 520, respectively, consist of forward or front yoke portions 510, 520 on one plane and rear yoke portions 410, 420 on a second plane. The yoke portions 410, 420 have a nonmagnetic gap 430 between the yoke portions 410, 420. The yoke portions 510, 520 have a nonmagnetic gap 530 between the yoke portions 510, 520. The front portion 410 of the bottom pole is connected to the rear portion 520 of the top pole 5 through external magnetic studs 431 and 433. The front portion 510 of the top pole is connected to the rear portion 420 of the bottom pole through the central magnetic stud 432. The cross-sectional area of the central magnetic stud 432 is at least twice as large as the cross-sectional area of the external stud 431 and 433. As shown in FIG. 8, the coil 310 is isolated from the yoke 400 by insulating layer 800. The write gap 442 and throat height are defined by magnetic extension 450 of the bottom pole.

Now looking at FIGS. 3–8, the flux path will be discussed.

The switching current in the coil 310 induces a magnetic flux flow within the yoke 400 of the write element 300. The flux path is shown with the aid of arrows carrying reference numerals in FIGS. 3, 6, 7 and 8. And arrow 810 and an arrow 812 show the flux path flow from the write gap 442 through the yoke portion 510 and then passes through the center stud 432 and upward through the yoke portion 420, as depicted by arrows 820, 821 and 822 in FIGS. 7, 6 and 8, respectively. The flux path then includes passing through the top stud 440, as depicted by arrow 830. The flux path, depicted by arrow 830, then passes into the yoke portion 520 and splits or substantially splits into two different flux paths, as depicted by arrows 840 and 841. The flux path substantially splits because the yoke element 520 is symmetrical and the whole entire yoke 400 is also symmetrical in shape. Therefore, it can be predicted with reasonable certainty that the flux path through yoke element 520 substantially splits and then passes through the external studs 431 and 433 to the yoke element 410, as depicted by reference numerals 850 and 851. The flux then passes through the yoke element 410, as depicted by arrows 860 and to the small magnetic stud 450 that is positioned so that it does not touch yoke portion 510 to produce the write gap 442. The magnetic flux then bridges the write gap or passes through the write gap 442 where the flux is then used to write transitions to the surface of the disk 134. This essentially completes the loop and the flux path that results from the current changes in the coil 310.

Figure 9:
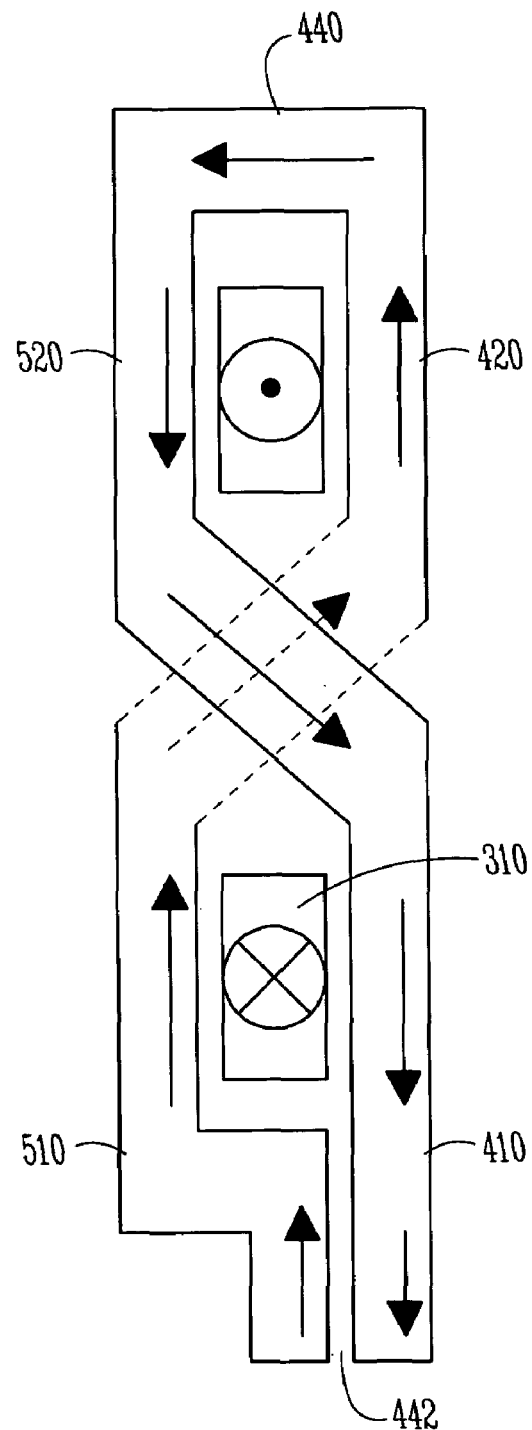
FIG. 9 is a schematic side view of the yoke and single-turn coil of the write element showing the double yoke-coil interaction according to the present invention.

FIG. 9 is a schematic side view of the yoke and single-turn coil of the write element showing the double yoke-coil interaction according to the present invention. The yoke 400 intertwined with the single-turn coil 310 provides at least two flux interactions between the yoke 400 and the coil 310. The multiple flux interactions significantly increase the inductive coupling between the yoke 400 and the coil 310. Thus, compared with write elements that have only a single flux interaction, a given amount of flux conducted by the yoke 400 during reading induces a greater electrical signal in the coil 310, and during writing an increased level of flux is generated in the yoke 400 in response to the write signal applied to the coil 310. In general, the induced electrical signal (during reading) and the induced flux (during writing) are increased by a factor equal to the increased number of flux interactions.

Figure 10:
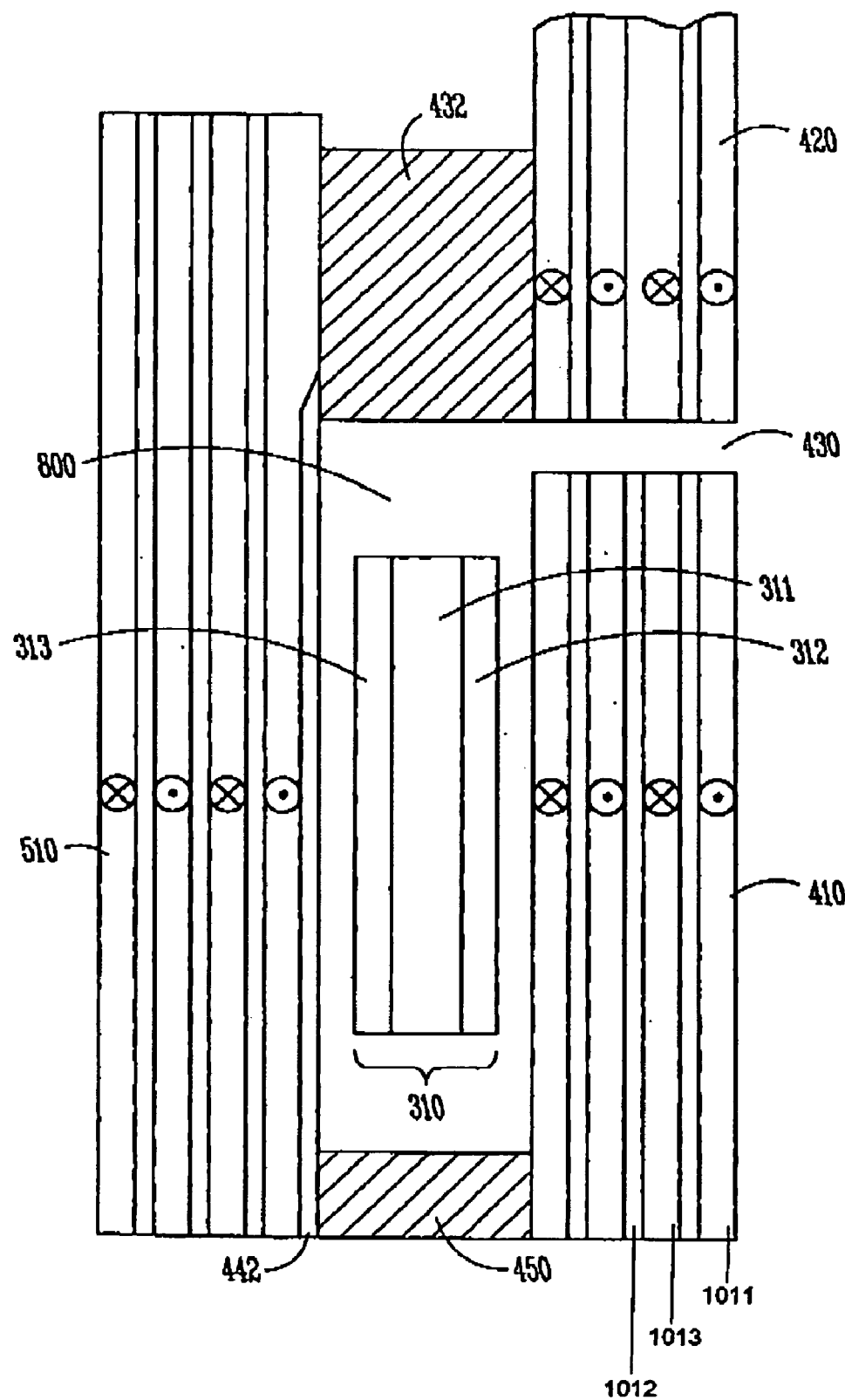
FIG. 10 is a cross-sectional view along line 6—6 of a front portion of the write element given in FIG. 3 with single-layer magnetic studs.

FIG. 10 is a cross-sectional view along line 6—6 of a portion of the write element given in FIG. 3 with single-layer magnetic studs. Yoke portions 410, 420, and 510 are shown in FIG. 10. The yoke portion 520 is not shown in FIG. 10. The center stud 432 and the extension 450 are made of a single metal layer. In this embodiment, the external magnetic studs 431, 433 are also made of a single metal layer. The magnetic stud 440 which connects the yoke portion 520 and the yoke portion 420 at one end of the flux path, although not shown, would also be made of a single metal layer. Each of the yoke portions 410, 420, 510, 520 is formed as a laminated element. The laminated elements are made of a thin layer of ferromagnetic material 1011 and 1013 antiferromagnetically exchange coupled to each other through a very thin nonmagnetic metallic layer 1012. The ferromagnetic layers 1011, 1013 have low coercivity, low magnetostriction and high magnetic moment and are 30–100 nm thick. The ferromagnetic layers 1011, 1013 are made of materials such as Ni45Fe55, NiFeCo, or FeCo. The thin nonmagnetic layers 1012 are made of Ru, Rh, Re, Cu, etc., and are 5–30 nm thick. The thickness of the nonmagnetic layers 1013 corresponds to the maximum of the exchange coupling field.

Figure 11:
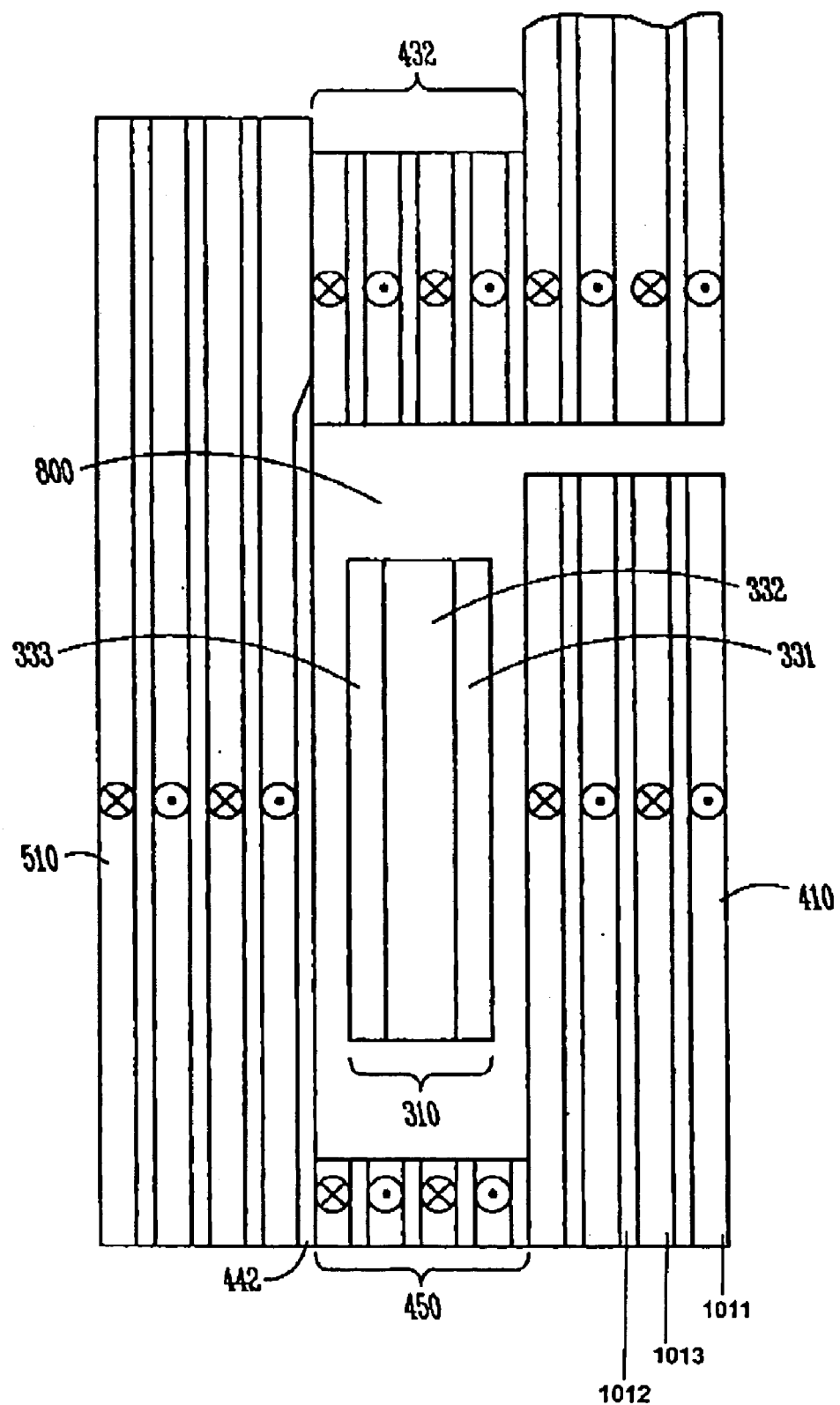
FIG. 11 is a cross-sectional view along line 6—6 of another embodiment of a write element having laminated magnetic studs.

FIG. 11 is a cross-sectional view along line 6—6 of another embodiment of a write element having laminated magnetic studs. This particular embodiment differs from the embodiment of FIG. 10 in that the magnetic studs 431, 432, 433, 440 and 450 which connect the various yoke portions 410, 420, 510, 520 are also made of laminate material. In other words, the single layer magnetic studs 431, 432, 433, 440 and 450 are replaced with studs formed of laminate material. The ferromagnetic layers 1011, 1013 of the studs are made of materials such as Ni45Fe55, NiFeCo, or FeCo. The thin nonmagnetic layers 1012 of the studs are made of Ru, Rh, Re, Cu, etc., and are 5–30 nm thick. The thickness of the nonmagnetic layers 1013 of the studs corresponds to the maximum of the exchange coupling field. The laminate layers are formed by alternating the ferromagnetic layers 1011, 1013 and non-magnetic yet conductive layers 1012. The laminate material is formed by alternately sputtering a non-magnetic layer 1012 and a magnetic layer 1011. Specifically the laminate material is placed on a turntable and then the non-magnetic layer 1012 and the magnetic layer 1011 are sputtered at the various turntable locations.

In one embodiment, the magnetic yoke 400 has a single domain state and is made of antiferromagnetically exchange-coupled superlattices.

The resultant write element 300 is a very high speed, high efficiency write element that is used as part of a transducer that includes a giant magneto resistive head. The yoke 400 forming a figure-8 wrap around the coil 310 results in at least twice as much magnetic flux, being induced in the coil for a given write current $I_W$ passing through the coil. In addition to this figure-8 wrap, the structure is unique and yields a write head capable of operating at a high frequency while being highly efficient.

Forming the yoke portions 410, 420, 510, 520 of a laminate material also increases the efficiency and speed of the write element 300. The laminate material keeps a single domain on each layer of the laminate in the magnetic structure. This speeds the flux transmission since less energy has to be expended in flipping magnetic domains. The laminate material merely has a series of coherent spins so that when magnetic flux is induced in a flux path the domains must only be moved slightly rather than flipped. Coherent spinning works by moving the magnetic flux within the layer through a certain number of degrees and never requires a flipping of a domain within the structure itself. As a result, the magnetic flux path is much quicker in transmitting the flux as the laminate provides a structure which enables coherent spinning. The application of antiferromagnetically exchange-coupled superlattices made of altered ferromagnetic and nonmagnetic layers for the yoke formation, stabilizes the single domain structure and increases the effective anisotropy of the yoke, thus reducing the switching time of the write element and increasing recording speed.

The yoke portions 410, 420, 510, 520 are each symmetrical. The resultant structure is also symmetrical which allows which provides for exact knowledge of where the flux path will be located.

In addition to being symmetrical, the whole structure is short and compact which limits the amount of reluctance of the coils. Since there is a shorter flux path, the magnetic flux only has to travel a short distance in order to be presented at the gap 442. The short, compact structure results in a low reluctance which is the resistance to changes in magnetization. The low reluctance makes the flux path capable of changing at much higher frequencies so that transitions may be written at higher frequencies and data rates. The structure could be approximately 10–12 microns in height and could be approximately 10–12 microns in width.

Since the coil 310 has very few turns, the coil has a low inductance. The coil is basically a single-turn coil. Inductance is proportional to the number of turns in the coil squared. The low inductance allows for the magnetic flux within the flux path to change quickly. In other words, the low inductance enables the flux to change quickly.

Still another aspect that makes the write element 300 capable of high frequency operation is that the coil 310 is formed as a transmission line. Still a further advantage is that the properties of U-shaped transmission lines are known and can be easily accommodated by those in the disc drive industry.

Advantageously, the write element 300 has a low inductance, because of the number of turns and a low reluctance because it can be made very small. The use of a transmission line for the coil 310 allows for high frequency current somewhere in the neighborhood of 1 megahertz. The use of the laminate for the flux path prevents domains from being flipped, which also takes time. The end result is a magnetic write element that can be used to produce very high rates of data transmission. Data rates of 2 gigabytes per second are achievable using this invention. It is contemplated that much higher write rates may also be achievable.

CONCLUSION

A thin film transducer includes a coil and a yoke. The coil of the transducer is formed as a transmission line. The coil is U-shaped. The yoke and coil are intertwined to provide more than two flux interactions between the yoke and the coil. The yoke is a planar, symmetrical structure. The yoke also includes a first pole portion made of a laminated material, and a second pole portion made of a laminated material. The laminated material includes a first layer of ferromagnetic material, a second layer of ferromagnetic material, and a layer of nonmagnetic conductive material interposed between the first layer of ferromagnetic material and the second layer of ferromagnetic material. The first layer of ferromagnetic material and the second layer of ferromagnetic material are antiferromagnically exchange coupled to each other through the layer of nonmagnetic conductive material. The first pole portion and the second pole portion are planar. The first pole portion has two ends and the second pole portion has two ends. The first pole portion and the second pole portion are connected to one another between the ends of the first pole portion and the second pole portion. The coil is U-shaped and consists of a single turn. The first pole portion is symmetrical and the second pole portion is symmetrical.

A slider includes a magneto resistive read element and a write element. The write element of the slider further includes a coil formed as a transmission line, and a yoke. The yoke is symmetrical and the yoke and coil are intertwined to provide more than two flux interactions between the yoke and the coil. The yoke forms a figure 8 around the coil to provide more than two flux interactions between the yoke and the coil. The first pole portion is made of a laminated material, and the second pole portion is made of a laminated material. The laminated material includes a first layer of ferromagnetic material, a second layer of ferromagnetic material, and a layer of nonmagnetic conductive material interposed between the first layer of ferromagnetic material and the second layer of ferromagnetic material. The two layers of ferromagnetic material in each of the first and second pole portions are separated by a layer of nonmagnetic conductive material. The two layers of ferromagnetic material in each of the first and second pole portions are antiferromagnically exchange coupled to each other through the layer of nonmagnetic conductive material.

A disc drive which uses the slider with a magneto resistive read element, and a write element further having a coil formed as a transmission line, and a yoke, also includes a base, a disc rotatably attached to the base, and an actuator assembly attached to the base. The actuator assembly includes the slider. The actuator assembly is adapted to move the slider between selected positions on the disc. The actuator assembly also includes a voice coil motor for moving the actuator assembly, and a control circuit for controlling the movement of the actuator assembly by controlling the amount of current provided to the voice coil motor. The disc drive of also includes a data channel.

A transducer includes a magneto resistive read element, and a write element. The write element includes a mechanism for providing a high frequency write current; and a yoke.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A thin film transducer comprising
a coil, wherein the coil is formed as a transmission line;
a first pole portion made of a laminated material; and
a second pole portion made of a laminated material, wherein the laminated material includes:
a first layer of ferromagnetic material;
a second layer of ferromagnetic material; and
a layer of nonmagnetic conductive material interposed between the first layer of ferromagnetic material and the second layer of ferromagnetic material, wherein the first layer of ferromagnetic material and the second layer of ferromagnetic material are antiferromagnetically exchange coupled to each other through the layer of nonmagnetic conductive material.

2. The thin film transducer of claim 1 wherein the first pole portion and the second pole portion are planar.

3. The thin film transducer of claim 1 wherein the first pole portion has two ends and the second pole portion has two ends, wherein the first pole portion and the second pole portion are connected to one another between the ends of the first pole portion and the second pole portion.

4. The thin film transducer of claim 1 wherein the coil is U-shaped.

5. The thin film transducer of claim 1 wherein the coil consists of a single turn.

6. The thin film transducer of claim 1 wherein the first pole portion is symmetrical.

7. The thin film transducer of claim 1 wherein the second pole portion is symmetrical.

8. A slider comprising:
a magneto resistive read element; and
a write element further comprising:
a coil wherein the coil is formed as a transmission line;
a first pole portion made of a laminated material; and
a second pole portion made of a laminate material, wherein each of the first and second pole portions includes at least two layers of ferromagnetic material which are separated by a layer of nonmagnetic conductive material and antiferromagnetically exchange coupled to each other through the layer of nonmagnetic conductive material.

9. The slider of claim 8, wherein the ferromagnetic material is selected from a group comprising $Ni_{45}Fe_{55}$, NiFeCo, and FeCo.

10. The slider of claim 8, wherein the nonmagnetic conductive material is selected from the group comprising Ru, Rh, Re, and Cu.

11. The slider of claim 8, wherein the nonmagnetic conductive material is approximately 5 to 30 nm thick.

12. The slider of claim 8, further comprising a third pole portion adjacent the second pole portion and a nonmagnetic material positioned between the second pole portion and third pole portion.

13. The slider of claim 12, further comprising a fourth pole portion adjacent the third pole portion and a nonmagnetic material positioned between the third pole portion and fourth pole portion.

14. The slider of claim 13, wherein each of the third and fourth pole portion comprises of a ferromagnetic material.

15. The slider of claim 14, wherein the ferromagnetic material is selected from a group comprising $Ni_{45}Fe_{55}$, NiFeCo, and FeCo.

16. The slider of claim 8, wherein the coil is U-shaped.

17. The slider of claim 8, wherein the first pole portion and second pole portion are intertwined with the coil to provide more than two flux interactions between the first pole portion, the second pole portion and the coil.

18. The slider of claim 8, wherein the first and second pole portion each are a planar symmetrical structure.

19. A thin film transducer comprising:
a first pole portion made of a first laminated material and a second pole portion made of a second laminated material;
a single turn coil adjacent the first and second vole, the single turn coil structured and positioned so that the single turn coil provides at least two flux interactions between the first and second poles and the single turn coil; and
wherein the first and second laminated material includes:
a first layer of ferromagnetic material, a second layer of ferromagnetic material, and a layer of Ru interposed between the first layer of ferromagnetic material and the second layer of ferromagnetic material.

20. The slider of claim 19, further comprising a third pole portion adjacent the second pole portion and a nonmagnetic material positioned between the second pole portion and third pole portion.

21. The slider of claim 20, further comprising a fourth pole portion adjacent the third pole portion and a nonmagnetic material positioned between the third pole portion and fourth pole portion.

22. The slider of claim 21, wherein each of the third and fourth pole portion comprises of a ferromagnetic material.

23. The slider of claim 19, further comprising a coil wherein the coil is formed as a transmission line.

24. The thin film transducer of claim 23, wherein the coil is U-shaped.

25. The slider of claim 19, wherein the first and second pole portion each are a planar symmetrical structure.

* * * * *